United States Patent
Yun et al.

(10) Patent No.: US 7,403,250 B2
(45) Date of Patent: Jul. 22, 2008

(54) APPARATUS FOR FORMING ALIGNMENT FILM OF LIQUID CRYSTAL DISPLAY DEVICE AND METHOD FOR FORMING ALIGNMENT FILM USING THE SAME

(75) Inventors: Heon-Do Yun, Daegu (KR); Yong-Sang Byun, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 511 days.

(21) Appl. No.: 10/787,405

(22) Filed: Feb. 27, 2004

(65) Prior Publication Data
US 2004/0169802 A1    Sep. 2, 2004

(30) Foreign Application Priority Data
Feb. 27, 2003   (KR)   .................. 10-2003-0012464

(51) Int. Cl.
*G02F 1/1337*    (2006.01)
(52) U.S. Cl. .................. 349/124; 349/123; 349/187
(58) Field of Classification Search ................. 349/123, 349/124, 73, 74, 187, 189, 190
See application file for complete search history.

(56) References Cited

U.S. PATENT DOCUMENTS

| | | | |
|---|---|---|---|
| 6,111,632 A * | 8/2000 | Tanuma et al. ............... | 349/187 |
| 6,277,529 B1 * | 8/2001 | Marumoto et al. ............ | 430/7 |
| 6,471,352 B2 * | 10/2002 | Akahira ....................... | 347/106 |
| 2005/0179708 A1 * | 8/2005 | Ben-Zur ........................ | 347/2 |

OTHER PUBLICATIONS

Machine translation of JP 09166783 A by Ueno et al.*

* cited by examiner

*Primary Examiner*—Andrew Schechter
*Assistant Examiner*—Lucy P Chien
(74) *Attorney, Agent, or Firm*—McKenna Long & Aldridge LLP

(57) ABSTRACT

A method for forming an alignment layer of a liquid crystal display device includes providing a substrate having a plurality of unit panels formed thereon, loading the substrate onto a stage, selectively dropping an alignment material onto a first one of the unit panel regions by an alignment material dropping unit having a plurality of heads, each of the heads having a plurality of holes arranged along a row at regularly-spaced interval distance d1, and forming an alignment layer on the substrate to have a uniform thickness.

5 Claims, 7 Drawing Sheets

APPARATUS FOR FORMING ALIGNMENT FILM OF LIQUID CRYSTAL DISPLAY DEVICE AND METHOD FOR FORMING ALIGNMENT FILM USING THE SAME

The present invention claims the benefit of Korean Patent Application No. 12464/2003 filed in Korea on Feb. 27, 2003, which is hereby incorporated by reference.

BACKGROUND OF THE INVENTION

1. Field of the Invention

The present invention relates to a method for fabricating a liquid crystal display device and, more particularly, to an apparatus for forming an alignment layer of a liquid crystal display device and method for forming an alignment layer using the same.

2. Description of the Related Art

With recent developments of various portable electronic devices, such as mobile phones, personal digital assistants (PDAs), and notebook computers, demand for light weight, thin profile, small flat panel display devices is increasing. Present research includes active development of the flat panel display devices including liquid crystal display (LCD) devices, plasma display panel (PDP) devices, field emission display (FED) devices, and vacuum fluorescent display (VFD) devices. Of these different devices, the LCD devices are actively being developed due to the simple mass-production techniques necessary to produce them, their easy driving systems, and implementation of high picture quality.

Figure 1:
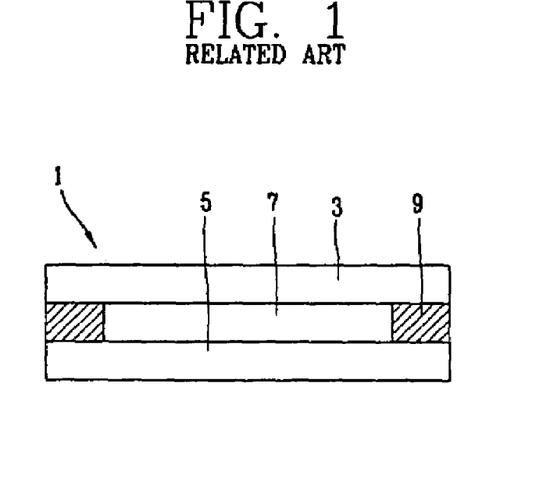
FIG. 1 is a cross sectional view of a liquid crystal display device according to the related art.

FIG. 1 is a cross sectional view of a liquid crystal display device according to the related art. In FIG. 1, a liquid crystal display device 1 includes a lower substrate 5, an upper substrate 3, and a liquid crystal layer 7 formed between the lower and upper substrates 5 and 3. The lower substrate 5 is a driving unit array substrate and includes a plurality of pixels (not shown), wherein each pixel includes a driving unit, such as a thin film transistor. The upper substrate 3 is a color filter substrate and includes a color filter layer for implementing a color.

A pixel electrode and a common electrode are respectively formed on the lower substrate 5 and the upper substrate 3. In addition, an alignment layer for aligning liquid crystal molecules of the liquid crystal layer 7 is formed on the pixel electrode and on the common electrode. The lower substrate 5 and the upper substrate 3 are attached by a sealing material 9, and the liquid crystal layer 7 is formed therebetween. The liquid crystal molecules of the liquid crystal layer 7 are driven by a driving unit formed at the lower substrate 5, wherein a quantity of light transmitted through the liquid crystal layer 7 is controlled to display an image.

Figure 2:
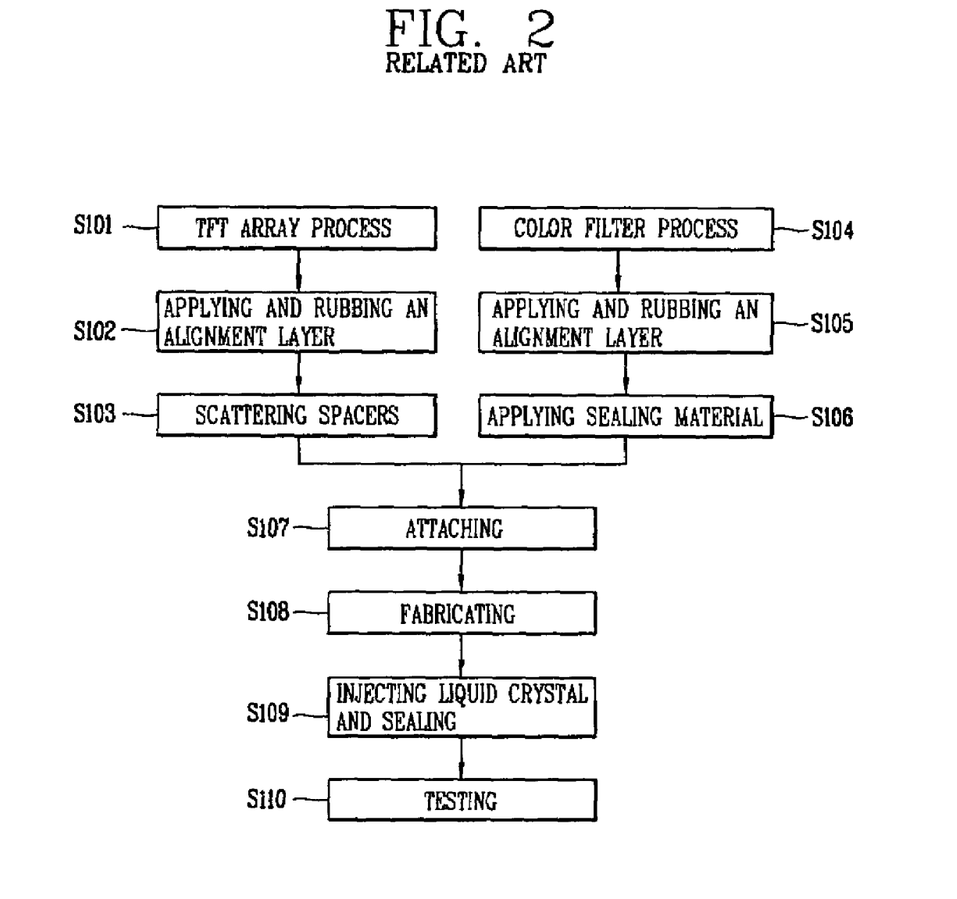
FIG. 2 is a flow chart of a method for fabricating a liquid crystal display device according to the related art.

FIG. 2 is a flow chart of a method for fabricating a liquid crystal display device according to the related art. In FIG. 2, the fabrication process of the liquid crystal display device is roughly divided into a driving unit array substrate process for forming a driving unit at the lower substrate 5, a color filter substrate process for forming the color filter at the upper substrate 3, and a cell process.

In FIG. 2, a step S101 includes forming a plurality of gate lines and a plurality of data lines on the lower substrate 5 using the driving device array process for defining a plurality of pixel areas. The step S101 includes formation of thin film transistors, and driving devices that are connected to the gate lines and the data lines at the pixel areas. In addition, the pixel electrode, which is connected to the thin film transistor through the driving device array process, is formed. The pixel electrode drives a liquid crystal layer when a signal is transmitted through the thin film transistor.

A step S104 includes formation of a color filter layer of R, G, and B colors, and formation of a common electrode on the upper substrate using the color filter process.

Steps S102 and S105 both include formation of alignment layers on the upper and lower substrates, wherein the alignment layers are rubbed to provide the liquid crystal molecules of the liquid crystal layer formed between the upper and lower substrates with an initial alignment and surface fixing force (i.e., pre-tilt angle and orientation direction).

A step S103 includes scattering a plurality of spacers onto the lower substrate for maintaining a uniform cell gap between the upper and lower substrates.

A step S106 includes formation of a sealing material along an outer portion of the upper substrate.

A step S107 includes attaching the upper and lower substrates together by compressing the upper and lower substrates together.

A step S108 includes dividing the attached upper and lower substrates into a plurality of individual liquid crystal panels.

A step S109 includes injection of the liquid crystal material into the liquid crystal panels through a liquid crystal injection hole, wherein the liquid crystal injection hole is sealed to form the liquid crystal layer.

A step S110 includes testing the injected liquid crystal panel.

Operation of the LCD device makes use of an electro-optical effect of the liquid crystal material, wherein anisotropy of the liquid crystal material aligns liquid crystal molecules along a specific direction. Accordingly, since control of the liquid crystal molecules significantly affects image stabilization of the LCD device, formation of the alignment layer is critical for fabricating an LCD device that produces quality images.

Figure 3:
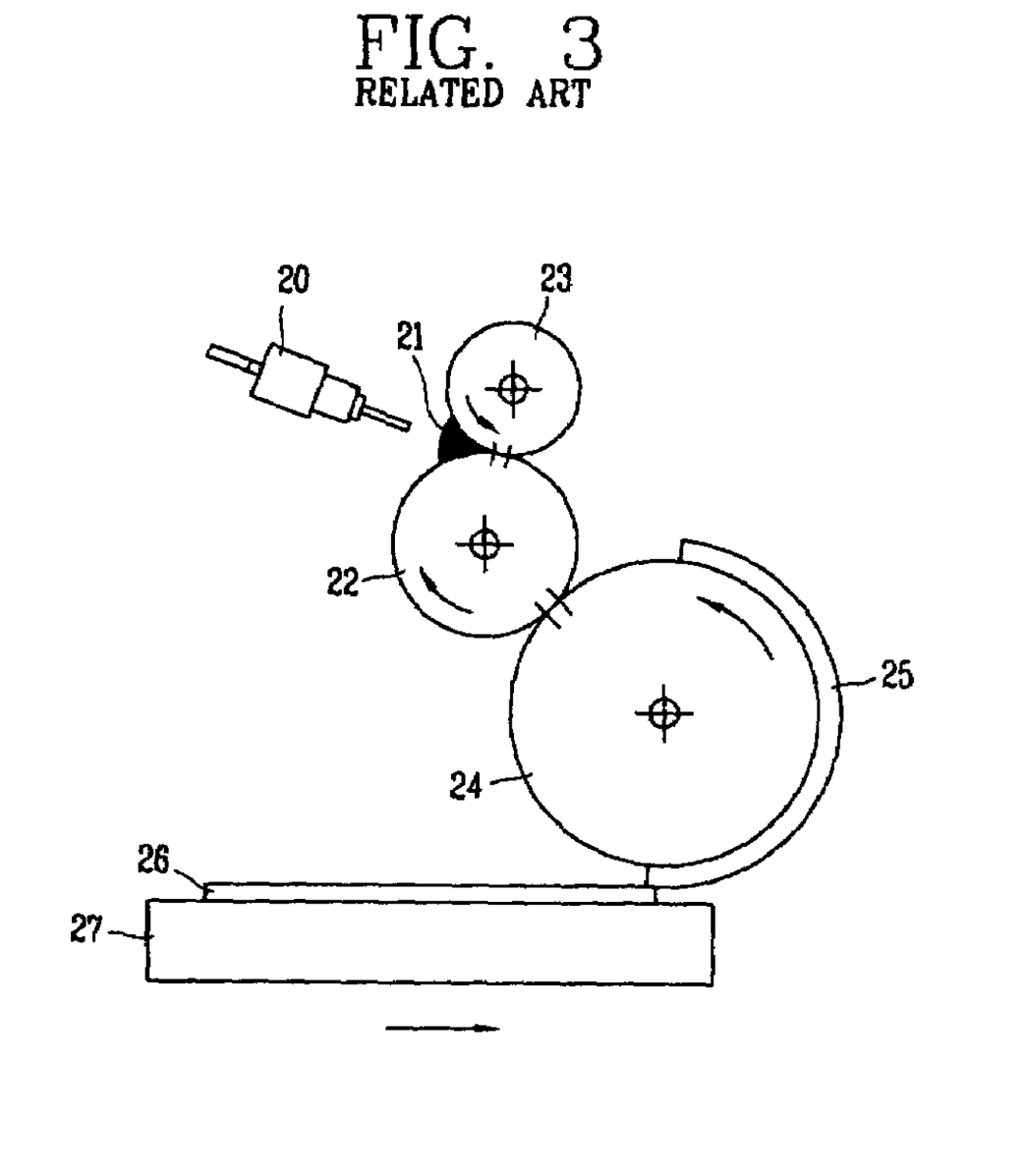
FIG. 3 is a schematic cross sectional view of a method for forming an alignment layer using a roller coating method according to the related art.

FIG. 3 is a schematic cross sectional view of a method for forming an alignment layer using a roller coating method according to the related art. In FIG. 3, an alignment material 21 is uniformly supplied using a dispenser 20 having an injector shape between an anylox roll 22 and a cylindrically-shaped doctor roll 23 as the anylox roll 22 and the doctor roll 23 rotate. Then, the alignment material 21 formed on a surface of the anylox roll 22 is transferred onto a rubber plate 25 when the anylox roll 22 rotates to contact a printing roll 24 upon which the rubber plate 25 is attached. The rubber plate 25 is aligned with a substrate 26 upon which the alignment material 21 will be applied, and a mask pattern is formed on the rubber plate 25 in order to selectively print the alignment layer on the substrate 26.

As a printing table 27, upon which the substrate 26 is loaded, is moved to contact the printing roll 24, the alignment material 21 is transferred onto the rubber plate 25 and is re-transferred onto the substrate 26 to form an alignment layer. Since a thickness of the alignment layer is about 500-1000 Å, thickness differences of 100 Å of the alignment layer may generate a blot on the screen of the LCD device. Accordingly, uniform thickness of the alignment layer is critical to display quality images on the screen of the LCD device.

However, since the dispenser 20 supplies the alignment material 21 onto the anylox roll 22 using a left-to-right motion along an upper part of the anylox roll 22, uniform thickness of the resulting alignment layer may not be achieved. For example, as a size of the substrate 26 increases, it becomes increasingly more difficult to form the alignment layer having a uniform thickness. Moreover, since all of the alignment material 21 transferred onto the rubber plate 25 is not necessarily perfectly re-transferred onto the substrate 26, a significant amount of the alignment material 21 is wasted, as compared to the amount of alignment material 21 that is re-transferred onto the substrate 26. Accordingly, the amount of wasted alignment material 21 unnecessarily increases production costs. In addition, when a model of the LCD device changes according to the size of the substrate, the doctor roll, anylox roll, and printing roll must be replaced. Moreover, since a cleaning process is periodically performed, the process is complicate and productivity deteriorates. Furthermore, as the substrate is enlarged in size, the size of the anylox roll and the printing roll inevitably increases. That is, as the size of substrates increases, the corresponding fabrication equipment also increases, thereby making it difficult to maintain a uniform thickness of the alignment layer.

SUMMARY OF THE INVENTION

Accordingly, the present invention is directed to an apparatus for forming an alignment film of a liquid crystal display device and a method for forming an alignment film using the apparatus that substantially obviates one or more of the problems due to limitations and disadvantages of the related art.

An object of the present invention is to provide an apparatus for forming an alignment layer of a liquid crystal display device having a uniform thickness across an entire surface of a substrate.

Another object of the present invention is to provide an apparatus for forming an alignment layer of a liquid crystal display device having reduced material waste.

Another object of the present invention is to provide an apparatus for forming an alignment layer of a liquid crystal display device adaptable for use with multi-model glass.

An object of the present invention is to provide a method forming an alignment layer of a liquid crystal display device having a uniform thickness across an entire surface of a substrate.

Another object of the present invention is to provide a method for forming an alignment layer of a liquid crystal display device having reduced material waste.

Another object of the present invention is to provide a method for forming an alignment layer of a liquid crystal display device adaptable for use with multi-model glass.

To achieve these and other advantages and in accordance with the purpose of the present invention, as embodied and broadly described, a method for forming an alignment layer of a liquid crystal display device includes providing a substrate having a plurality of unit panels formed thereon, loading the substrate onto a stage, selectively dropping an alignment material onto a first one of the unit panel regions by an alignment material dropping unit having a plurality of heads, each of the heads having a plurality of holes arranged along a row at regularly-spaced interval distance d1, and forming an alignment layer on the substrate to have a uniform thickness.

In another aspect, an apparatus for forming an alignment layer of a liquid crystal display device includes an alignment material dropping unit including a plurality of heads each having a plurality of holes for dropping an alignment material onto a substrate, an alignment material supplying unit for supplying an alignment material to the alignment material dropping unit, and a connection line unit for connecting the alignment material dropping unit and the alignment material supply unit, wherein a first portion of the plurality of heads are disposed at an angle θ with respect to a second portion of the plurality of heads.

In another aspect, an apparatus for forming an alignment layer of a liquid crystal display device includes an alignment material dropping unit having a plurality of holes arranged in an offset pattern for dropping an alignment material onto a substrate, an alignment material supply unit for supplying an alignment material to the alignment material dropping unit, and a connection line unit for connecting the alignment material dropping unit and the alignment material supplying unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4A:
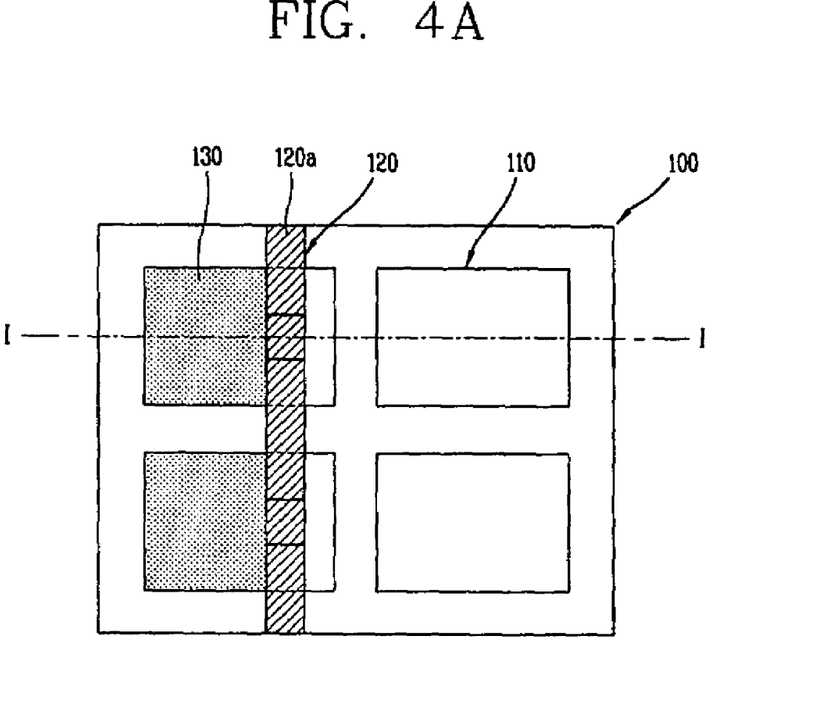
FIG. 4A is a plan view of an exemplary method for forming an alignment layer of a liquid crystal display device according to the present invention.
Figure 4B:
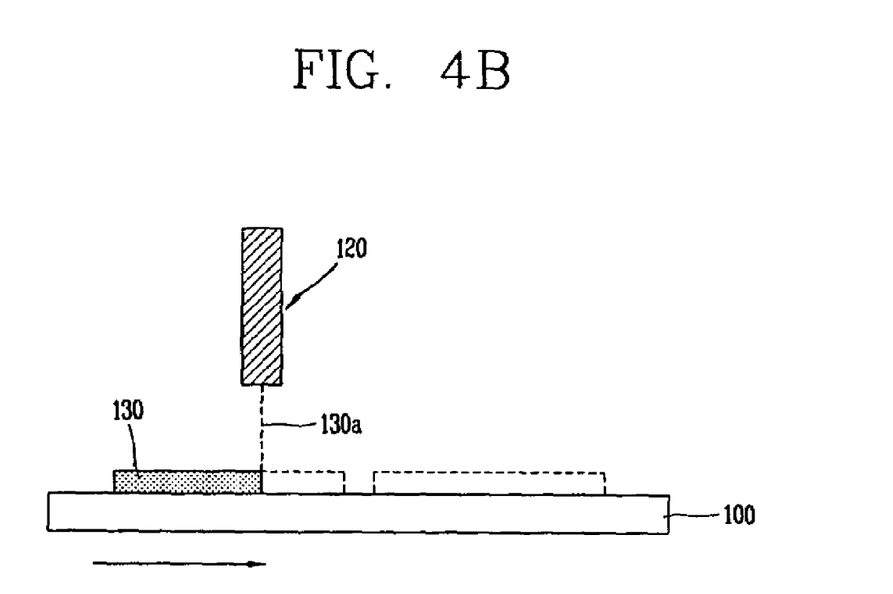
FIG. 4B is a cross sectional view along I-I of FIG. 4A showing the exemplary method for forming an alignment layer of a liquid crystal display device according to the present invention.

FIG. 4A is a plan view of an exemplary method for forming an alignment layer of a liquid crystal display device according to the present invention, and FIG. 4B is a cross sectional view along I-I of FIG. 4A showing the exemplary method for forming an alignment layer of a liquid crystal display device according to the present invention.

In FIG. 4A, an alignment layer forming apparatus may include an alignment material dropping unit 120 for dropping an alignment material onto a substrate 100 and a stage (not shown) for loading the substrate 100 thereupon. After the substrate 100 is provided, the substrate 100 may be loaded onto the stage (not shown) upon which an alignment layer may be formed. The substrate 100 may include a mother glass upon which a plurality of unit panels may have been formed, such as a thin film transistor array substrate fabricated through a thin film transistor array fabrication process or a color filter substrate 110 fabricated through a color filter fabrication process.

During the thin film transistor array fabrication process, a first transparent substrate may be provided, a plurality of gate lines and data lines may be provided along vertical and horizontal directions on the substrate to define a plurality of pixel areas, a plurality of thin film transistors may be formed, a driving device may be provided to be connected to the gate line and the data line at each of the plurality of pixel areas, a passivation layer may be formed along an entire surface of the thin film transistors and the pixel areas, and a plurality of transparent pixel electrodes may be formed thereupon.

During the color filter fabrication process, a second transparent substrate may be provided, upon which a black matrix may be formed, and a color filter may be formed at areas corresponding to the pixel areas, upon which a common electrode may be formed.

Then, an alignment layer may be formed on the substrate 100 by using an alignment layer forming apparatus that may employ an ink-jet method, and may include an alignment material dropping unit 120 for directly dropping an alignment material onto the substrate 100, an alignment material supply unit (not shown) for supplying an alignment material to the alignment material dropping unit 120, and a connection line unit (not shown) for connecting the alignment material dropping unit 120 and the alignment material supply unit.

The alignment material dropping unit 120 may include at least one head 120a, wherein each head 120a may include a plurality of holes. A supply amount of the alignment material to be dropped onto the substrate and a dropping position of the alignment material may be controlled by opening and closing each of the holes, either simultaneously or individually. In addition, an alignment layer processing time may be controlled by controlling the number of holes either in the open position and/or the closed position.

When a nitrogen gas (N2) is supplied to the alignment material supply unit storing the alignment material, pressure in the alignment material supply unit may increase due to the nitrogen gas. Accordingly, the alignment material may be introduced into the alignment material dropping unit 120 through the connection line unit. Thus, the introduced alignment material may be dropped onto the substrate 100 through the holes formed at the alignment material-dropping unit 120, thereby forming an alignment layer having a uniform thickness on the substrate 100.

Formation of the alignment layer may be accomplished according to movement of the stage upon which the substrate may be positioned, or according to movement of the alignment material dropping unit 120. Accordingly, an alignment layer 130 may be formed on a region of the mother substrate 100 where the alignment material dropping unit 120 has passed. In this case, the alignment layer 130 may be selectively formed by closing some of the holes formed at the alignment material dropping unit 120 when the alignment material dropping 120 is moved over the stage (not shown) to supply the alignment material 130a onto the substrate 100. The alignment layer-formed area may be substantially the area where the thin film transistor array and the color filter substrate have been formed. Alternatively, the alignment layer-formed area may be greater than or less than the area where the thin film transistor array and the color filter substrate have been formed.

Since the alignment material dropping unit 120 may include at least one head 120a having the plurality of holes to control the alignment material dropping area according to the size of the mother substrate 100, alignment material dropping unit 120 may easily cope with larger sized substrates by increasing the number of heads 120a.

Figure 5:
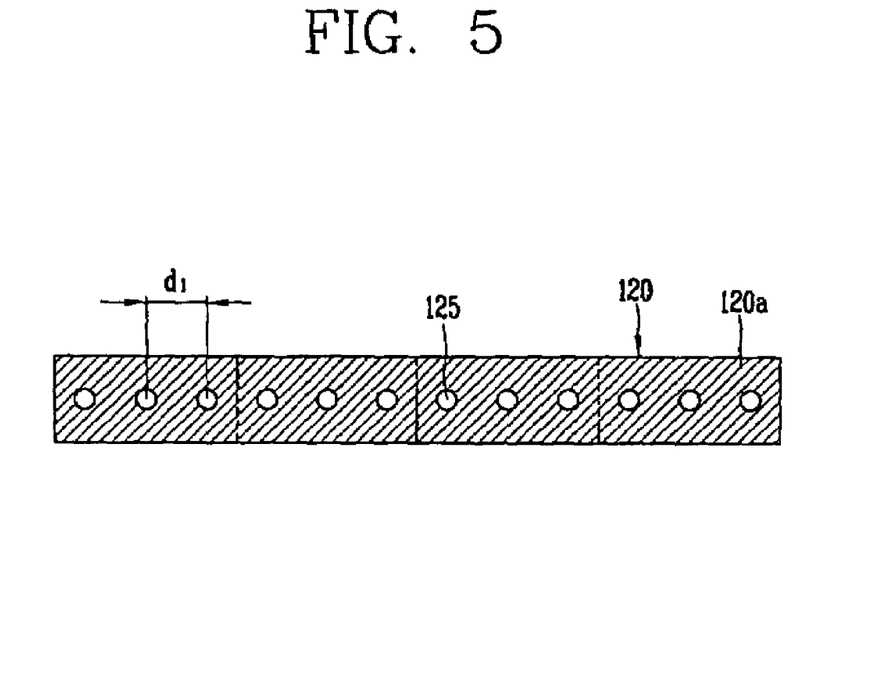
FIG. 5 is a plan view of an exemplary bottom surface of an alignment material dropping unit according to the present invention.

FIG. 5 is a plan view of an exemplary bottom surface of an alignment material dropping unit according to the present invention. In FIG. 5, the alignment material dropping unit 120 may include a linear array of a plurality of heads 120a, wherein each of the heads 120a may include a plurality of holes 125 disposed at regular intervals d1 along a linear array direction. Accordingly, since the alignment material may be dropped onto the substrate through the holes 125, the thickness of the alignment layer and uniformity of the thickness of the alignment layer formed on the substrate may be controlled by changing a size, or sizes, of the holes 125 and the isolation interval d1 between the holes 125. Although not shown, each of the holes 125 may have different diameters, thereby increasing control of the thickness of the alignment layer and uniformity of the thickness of the alignment layer. In addition, since each of the holes 125 may be opened and closed, either individually or as a group, the alignment layer may be easily formed by selectively opening and closing the holes 125, even for multi-model glass substrates having two or more different substrate models.

According to the present invention, the alignment layer forming apparatus using the ink-jet method may easily cope with the various substrate models and large-sized substrates. In addition, since the necessary amount of alignment material may be dropped directly onto the substrate, consumption of the alignment material may be minimized, thereby reducing fabrication costs of the liquid crystal display device.

In FIG. 5, the narrower the interval d1, the more uniform the thickness of the alignment layer may be formed. However, since the holes 125 may each have a specific diameter, reducing the interval d1 may be limited. Moreover, since the holes 125 may each have different specific diameters, further reduction of the interval d1 may be limited.

Figure 6:
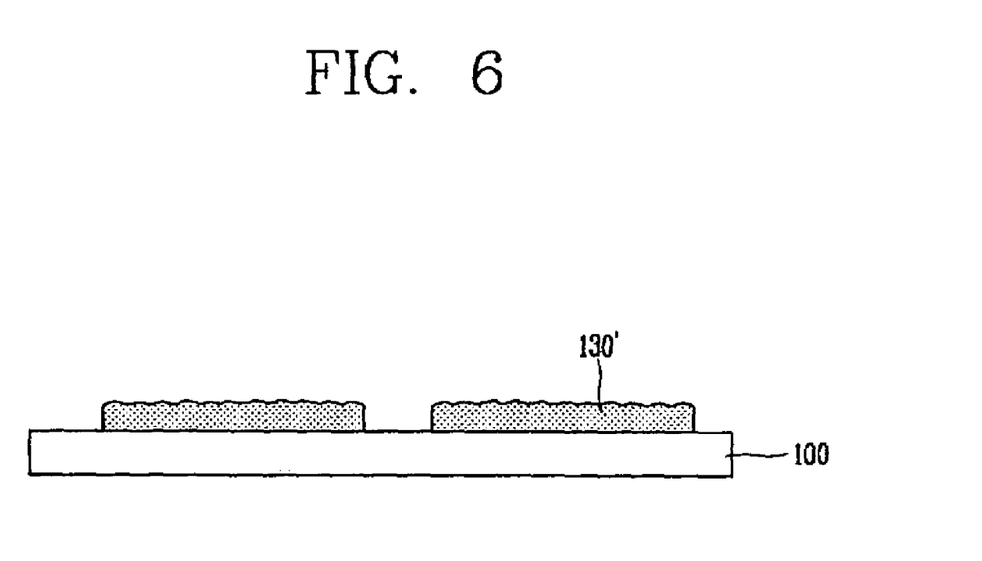
FIG. 6 is a cross sectional view of an alignment layer having a defective thickness.

Since the alignment layer may be formed by using unidirectional movement of the stage or the alignment material dropping unit 120, if the interval d1 between the holes 125 is wide, as shown in FIG. 6, the alignment layer formed at the area where the alignment material is dropped may be thicker than other areas. Thus, the uneven thickness of the alignment layer may generate a stain on a display screen of the LCD device. In order to avoid such problems, instead of reducing the interval d1, the stage upon which the substrate is positioned or the alignment material dropping unit may be bi-directionally reciprocated, or may be shifted to reduce an isolation distance of alignment materials dropped onto the substrate, thereby enhancing uniformity of the thickness of the alignment layer.

Figure 7:
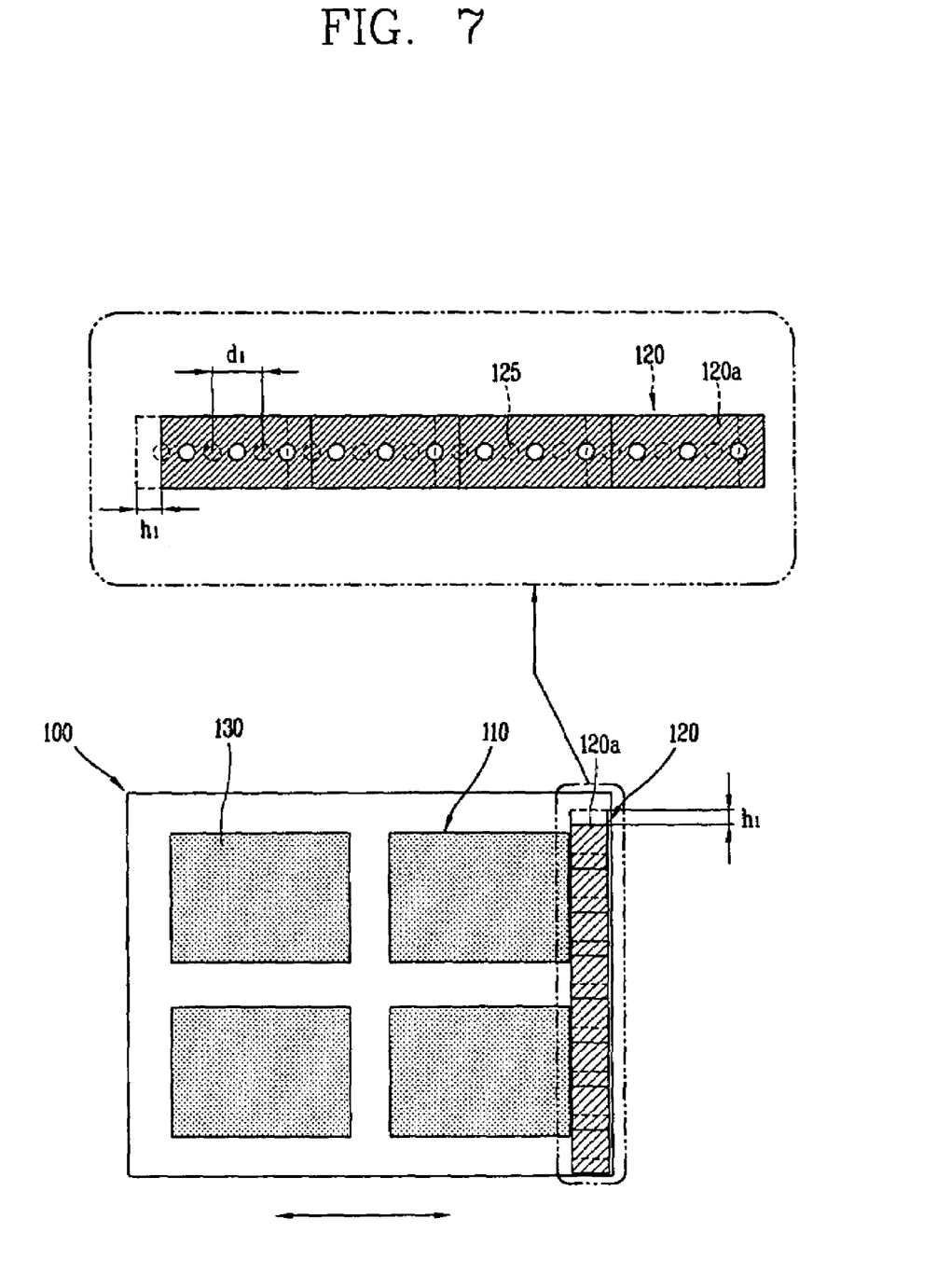
FIG. 7 is a plan view of another exemplary method for forming an alignment layer of a liquid crystal display device according to the present invention.

FIG. 7 is a plan view of another exemplary method for forming an alignment layer of a liquid crystal display device according to the present invention. In FIG. 7, similar elements have the same reference numerals as those in FIG. 4.

In FIG. 7, the alignment layer 130 may be formed according to a reciprocal movement of the stage (not shown) or by the alignment material dropping unit 120. Accordingly, after a substrate is loaded on the stage, the alignment material dropping unit 120 may be positioned at one side of the stage. Then, an alignment material may be dropped onto the substrate through the reciprocal movement of the stage or by the alignment material dropping unit 120.

For example, the stage may be moved by one time period, the alignment material dropping unit 120 positioned at one side of the stage may be shifted along a first direction by a prescribed distance h1 and then moved by one time period along a second direction opposite to the first direction, thereby dropping the alignment material onto the substrate twice.

In addition, when the stage is at a fixed position, only the alignment material dropping unit 120 may be reciprocally moved, or the stage and the alignment material dropping unit 120 may be moved by one time period. Thus, after the one time period movement, the alignment material dropping unit 120 positioned at one side of the stage may be shifted by a prescribed distance. For example, when a first alignment material is dropped onto the substrate 100 according to unidirectional movement of the stage along a first direction from an initial position, the alignment material dropping unit 120 may be positioned at an opposite side of the initial position due to the movement of the stage. At this time, the alignment material dropping unit 120 may be moved along a direction vertical to the first direction of the stage so that positions of the holes may be shifted. Then, the stage may be moved along a second direction opposite to the first direction, and a second alignment material may be dropped onto the substrate 100 upon which the first alignment material has been dropped. In this case, the alignment material dropping unit 120 may be moved, and the movement order of the stage and the alignment material dropping unit 120 may be changed with respect to each other.

In FIG. 7, the shift interval h1 may be smaller than the distance d1 between the holes 125. In addition, after the alignment material dropping unit 120 has been shifted, the initial positions of the holes and the positions of the holes after movement may be on along a straight line.

Figure 8:
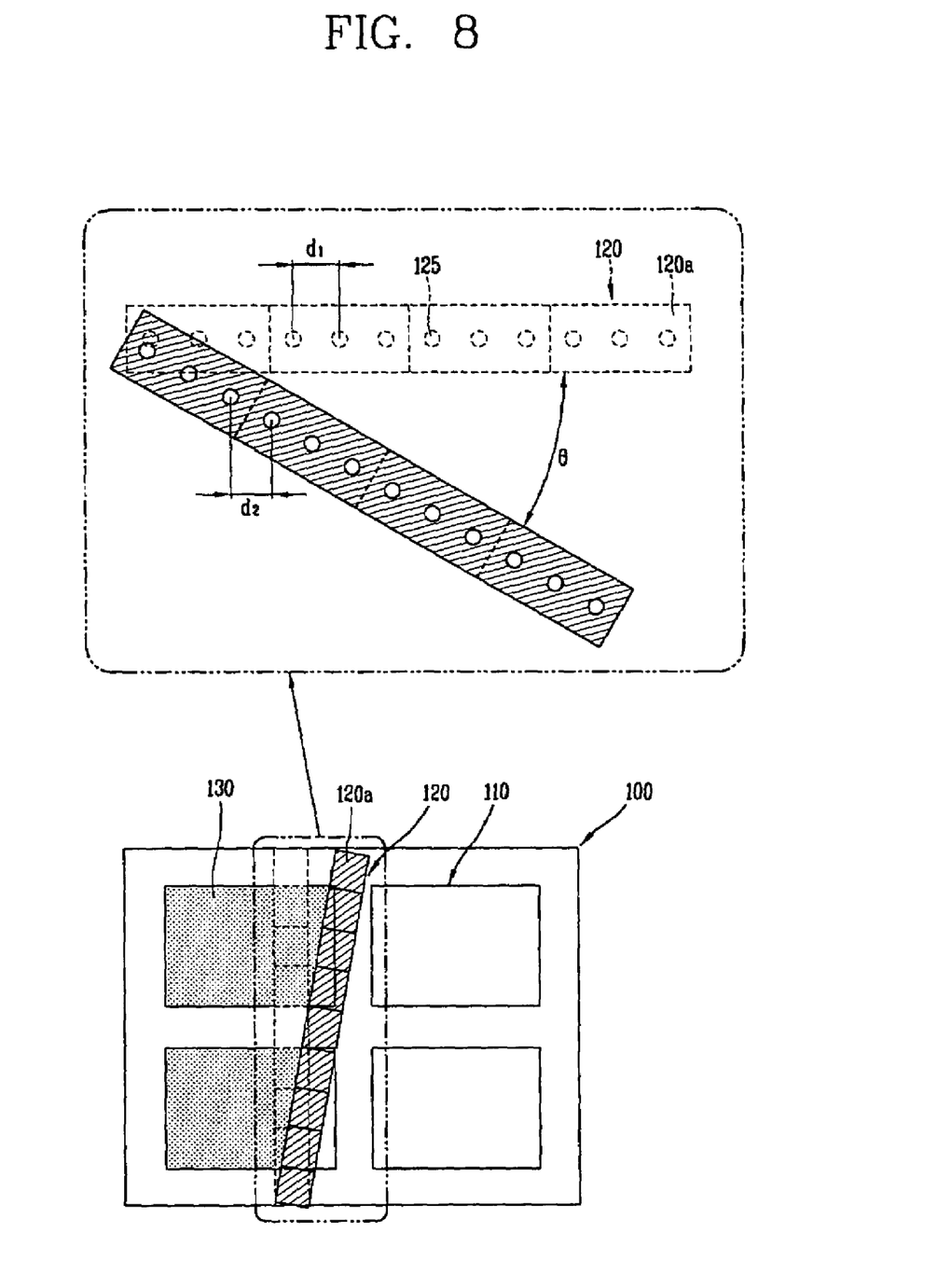
FIG. 8 is a plan view of another exemplary method for forming an alignment layer of a liquid crystal display device according to the present invention.

FIG. 8 is a plan view of another exemplary method for forming an alignment layer of a liquid crystal display device according to the present invention. In FIG. 8, a first end of the alignment material dropping unit 120 may be fixed, a second end of the alignment material dropping unit 120 may be inclined by as much as an angle θ with respect to an initial position of the alignment material dropping unit 120. Accordingly, a distance d2 between the holes 125 when the alignment material is dropped onto the substrate 100 may be reduced, as compared to the distance d1 between the original hole 125 and the actual hole 125. For example, when the first end of the alignment material dropping unit 120 may be fixed, when the second end is inclined, and the isolation distance d1 between the holes 125 may be the same. However, the distance d2 between alignment materials dropped onto the substrate through the holes 125 may be reduced. Thus, without reducing the interval d1, the distance between alignment materials dropped onto the substrate may be reduced to enhance uniformity of the thickness of the alignment layer. At this time, the angle θ may be within a range of about 0°<θ and about θ<90°.

Figure 9:
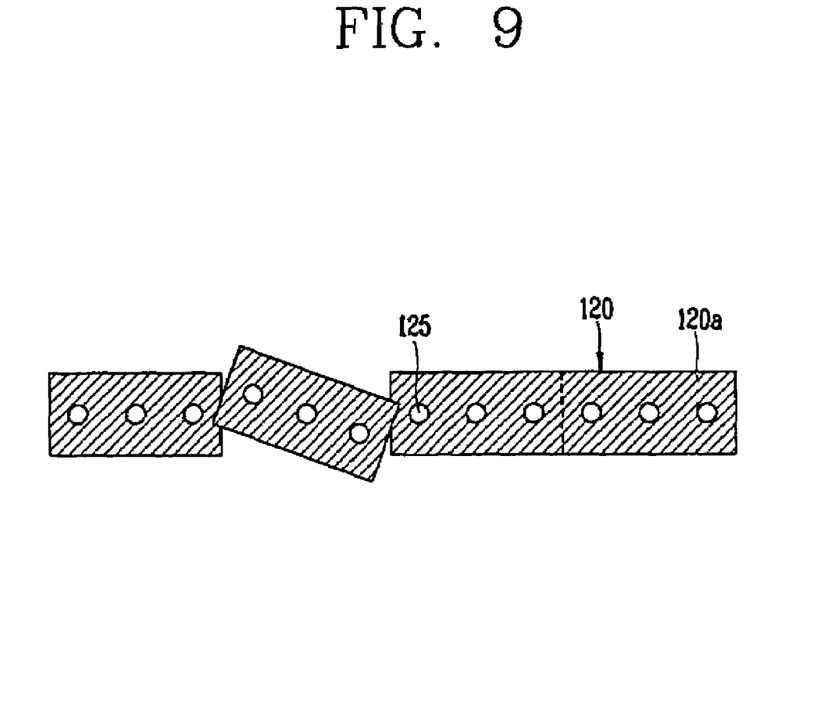
FIG. 9 is a plan view of another exemplary method for forming an alignment layer of a liquid crystal display device according to the present invention.

FIG. 9 is a plan view of another exemplary method for forming an alignment layer of a liquid crystal display device according to the present invention. In FIG. 9, since the alignment material dropping unit 120 may includes a plurality of the heads 120a, an alignment layer may be formed by partially inclining only a single one of the heads 120a. For example, in a multi-model glass model, the alignment material dropping distance may be narrowed if the model is relatively small. Thus, a corresponding head 120a may be partially inclined only within a region where the model is relatively small. In addition, the positions of the other heads 120a may be fixed so that an alignment layer may be formed for each model having a different size. In this case, the alignment layer may be formed by reciprocally moving the stage or the alignment material dropping unit 120.

Although not shown, another exemplary embodiment of the present invention may include shifting the alignment material dropping unit along a first direction perpendicular to a second direction in which the alignment material is dropped. Alternatively, a first end of the alignment material dropping unit may be fixed, and a second end of the alignment material dropping unit may be inclined to form a uniform alignment layer. However, in this case, the alignment material dropping unit 120 may be required to be shifted or moved within a prescribed range, which may be inconvenient. For example, when the alignment material dropping unit is shifted (in FIG. 7), the shift distance h1 may be smaller than the distance d1 between the holes 125. Furthermore, when a first side of the alignment material dropping unit is inclined (in FIG. 8), a tilt angle of the alignment material dropping unit may be within a range such that the distance d2 between alignment materials as dropped onto the substrate is smaller than the distance d1 between the original holes.

Figure 10:
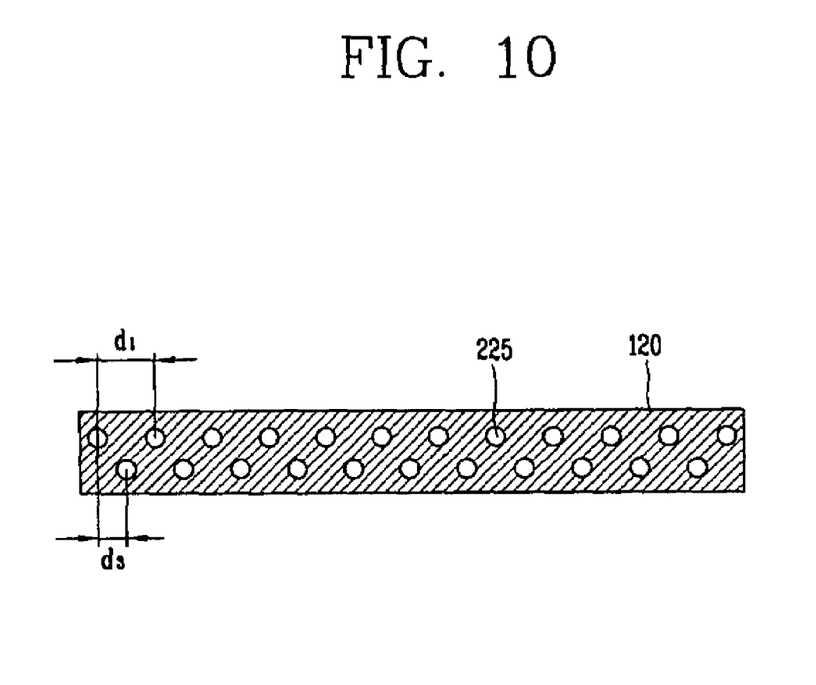
FIG. 10 is a plan view of another exemplary method for forming an alignment layer of a liquid crystal display device according to the present invention.

FIG. 10 is a plan view of another exemplary method for forming an alignment layer of a liquid crystal display device according to the present invention. In FIG. 10, holes 225 may be arranged in an offset pattern (i.e., zigzags) to reduce a distance between discharged alignment materials. For example, an interval d1 between the holes 225 disposed along a first straight line may be the same along an upper line portion and a lower line portion. However, the holes 225 of the upper line portion and the holes 225 of the lower line portion may be arranged in the offset pattern, wherein a distance d3 between adjacent alignment materials discharged through the holes 225 may be reduced, as compared to the distance d1. Accordingly, similar to the exemplary embodiments, a uniform alignment layer may be formed by reducing the alignment material dropping distance.

According to the present invention, an apparatus for forming an alignment layer of a liquid crystal display device and method for forming an alignment layer using the apparatus may include an ink-jet method, thereby forming a uniform alignment layer by reducing a distance between holes of an alignment material dropping unit. In addition, a uniform alignment layer may be formed by using the alignment layer forming apparatus having a head with a plurality of holes. Thus, the alignment layer forming method may accomodate large-sized substrates by controlling the number of heads. Furthermore, since the alignment layer forming process may be simplified, fabrication efficiency may be enhanced. Thus, since amounts of the alignment material may be dropped within regions where an alignment layer is to be formed, the alignment material may not be wasted and fabrication costs may be reduced.

According to the present invention, by shifting the alignment material dropping unit or by arranging the holes in an offset pattern (i.e. zigzag pattern), a distance between alignment materials dropped onto the substrate may be reduced, wherein a uniform alignment layer may be formed across an entire surface of the substrate.

The apparatus for forming an alignment layer of a liquid crystal display device and method for forming an alignment layer using the apparatus in accordance with the present invention have many advantages. For example, since an alignment layer may be formed using an ink-jet method, material costs may be reduced and fabrication processes may be simplified. Thus, production efficiency may be improved. Since an alignment material may be dropped by shifting a alignment material dropping unit by a specific angle, an isolation distance between alignment materials dropped onto the substrate may be reduced, thereby forming a uniform alignment layer. , It will be apparent to those skilled in the art that various modifications and variations can be made in the apparatus for forming alignment film of liquid crystal display device and method for forming alignment film using the apparatus of the present invention without departing from the spirit or scope of the invention. Thus, it is intended that the present invention cover the modifications and variations of this invention provided they come within the scope of the appended claims and their equivalents.

What is claimed is:

1. A method for forming an alignment layer of a liquid crystal display device, comprising:
    providing a substrate having a plurality of unit panels formed thereon;
    loading the substrate onto a stage;
    selectively dropping an alignment material onto a first one of the unit panel regions by an alignment material dropping unit having at least one head, each head having a plurality of holes; and
    forming an alignment layer on the substrate to have a uniform thickness,
    wherein the selective dropping of the alignment material onto the substrate comprises:
    positioning the alignment material dropping unit at a first side of the stage;
    driving the alignment material dropping unit from the first side to a second side of the stage to drop the alignment material through holes along a plurality of first dropping paths along a first dropping direction;
    shifting the alignment material dropping unit by a predetermined distance along a direction substantially perpendicular to the first dropping direction; and
    driving the alignment material dropping unit from the second side to the first side of the stage to drop the alignment material through holes along a plurality of second dropping paths,
    wherein the shift distance of the alignment material dropping unit is smaller than a distance between the holes, such that the second dropping paths are disposed in a region at a separation distance from the first dropping paths between the first dropping paths, whereby the alignment materials in the first and second dropping paths spread after dropping to contact each other.

2. A method for forming an alignment layer of a liquid crystal display device, comprising:
    providing a substrate having a plurality of unit panels formed thereon;
    loading the substrate onto a stage;
    selectively dropping an alignment material onto a first one of the unit panel regions by an alignment material dropping unit having at least one head, each head having a plurality of holes; and
    forming an alignment layer on the substrate to have a uniform thickness,
    wherein the selective dropping of the alignment material onto the substrate comprises:
    positioning the alignment material dropping unit at a first side of the stage;
    driving the alignment material dropping unit from the first side to a second side of the stage to drop the alignment material through holes along a plurality of first dropping paths along a first dropping direction;
    shifting the alignment material dropping unit by a predetermined shift distance along a direction substantially perpendicular to the first dropping direction; and
    driving the alignment material dropping unit from the second side to the first side of the stage to drop the alignment material through holes along a plurality of second dropping paths,
    wherein the shift distance of the alignment material dropping unit is smaller than a distance between the holes, such that the second dropping paths are disposed in a region at a separation distance from the first dropping paths between the first dropping paths, whereby the alignment materials in the first and second dropping paths spread after dropping to contact each other.

3. A method of forming an alignment layer of a liquid crystal display device, comprising:
    providing a substrate having a plurality of unit panels formed thereon;
    dropping first alignment material at first dropping areas using an alignment material dropping unit, the alignment material dropping unit including a plurality of heads having a plurality of holes dropping the alignment material therethrough; and
    dropping second alignment material at second dropping areas using the alignment material dropping unit,
    wherein the second dropping areas are disposed between the first dropping areas, and
    wherein dropping first alignment material includes positioning the alignment material dropping unit at a first side of the substrate, and wherein dropping the second alignment material includes shifting the alignment material dropping unit along a second side opposite the first side of the substrate by a predetermined distance, and wherein the predetermined distance is smaller than a distance between the plurality of holes, such that the second dropping paths are disposed in the region at a separation distance from the first dropping paths between the first dropping paths, whereby the alignment material in the first and second dropping paths spread so that the alignment materials in the first and second dropping paths contact each other.

4. The method according to claim 3, wherein the first dropping the alignment material includes;
    positioning the alignment material dropping unit at a first side of the substrate; and
    driving the alignment material dropping unit to a second side of the substrate opposite the first side to drop the alignment material at the first dropping area.

5. The method according to claim 3, wherein the dropping the second alignment material includes returning the alignment material dropping unit to the first side of the substrate to drop the alignment material at the second dropping areas.

* * * * *